US012468262B2

(12) United States Patent
Monfort

(10) Patent No.: US 12,468,262 B2
(45) Date of Patent: Nov. 11, 2025

(54) CONTROL DEVICE FOR A TIMEPIECE

(71) Applicant: BULGARI HORLOGERIE SA, Neuchâtel (CH)

(72) Inventor: Fanny Monfort, La-Chaux-de-Fonds (CH)

(73) Assignee: BULGARI HORLOGERIE SA, Neuchâtel (CH)

( * ) Notice: Subject to any disclaimer, the term of this patent is extended or adjusted under 35 U.S.C. 154(b) by 368 days.

(21) Appl. No.: 17/973,510

(22) Filed: Oct. 25, 2022

(65) Prior Publication Data

US 2023/0129573 A1 Apr. 27, 2023

(30) Foreign Application Priority Data

Oct. 27, 2021 (CH) ............................... 070455/2021

(51) Int. Cl.
*G04B 19/28* (2006.01)
*G04B 3/04* (2006.01)
*G04B 37/10* (2006.01)

(52) U.S. Cl.
CPC ......... *G04B 19/283* (2013.01); *G04B 37/103* (2013.01); *G04B 3/04* (2013.01)

(58) Field of Classification Search
CPC ...... G04B 19/283; G04B 37/103; G04B 3/04; G04B 3/045; G04B 37/066; G04B 37/10; G04B 3/041; G04B 27/02
See application file for complete search history.

(56) References Cited

U.S. PATENT DOCUMENTS

| | | | | |
|---|---|---|---|---|
| 3,747,329 A | 7/1973 | Golay | | |
| 7,360,944 B2 | 4/2008 | Morel | | |
| 11,243,498 B2 * | 2/2022 | Kwiecinski | ............ | G04B 3/041 |
| 11,703,802 B2 * | 7/2023 | Avril | ...................... | G04B 37/06 368/190 |

(Continued)

FOREIGN PATENT DOCUMENTS

| | | |
|---|---|---|
| FR | 1453026 A | 4/1966 |
| FR | 2983979 A1 | 6/2013 |

(Continued)

OTHER PUBLICATIONS

Swiss Search Report dated Jun. 15, 2022 in priority application No. CH704552021; with English machine translation (total 8 pages).

(Continued)

*Primary Examiner* — Edwin A. Leon
(74) *Attorney, Agent, or Firm* — Seckel IP, PLLC

(57) ABSTRACT

The control device (1) for a timepiece has a body (4) intended to rotate about a rotation axis (X) in a case middle (2) of a timepiece to drive a mechanism of the timepiece, and a crown head (5) movable in translation relative to the body, parallel to the rotation axis, between a first position and a second position. The body has a first coupling (46) and the crown head has a second coupling (53), arranged so that in the first position, the body and the crown head are uncoupled, and in the second position, the body and the crown head are coupled. The control device has a first formation (47A) and a second formation (47B), and a locking element able to cooperate with the first formation to stabilize the first position, and with the second formation to stabilize the second position.

20 Claims, 2 Drawing Sheets

(56) References Cited

U.S. PATENT DOCUMENTS

| | | | | |
|---|---|---|---|---|
| 11,809,139 | B2 * | 11/2023 | Kanmaz ............... | G04B 37/103 |
| 2007/0147186 | A1 | 6/2007 | Morel | |

FOREIGN PATENT DOCUMENTS

| | | | |
|---|---|---|---|
| FR | 2993062 | A1 | 1/2014 |
| JP | S52-86447 | U | 6/1977 |

OTHER PUBLICATIONS

EP Office Action dated Jan. 29, 2024 in counterpart application No. EP 22203740.0; with English machine translation (total 14 pages).

* cited by examiner

CONTROL DEVICE FOR A TIMEPIECE

This application claims priority of Swiss patent application No. CH070455/2021 filed Oct. 27, 2021, the content of which is hereby incorporated by reference herein in its entirety.

TECHNICAL FIELD OF THE INVENTION

The invention relates to a control device for a timepiece, the control device comprising a crown head movable in translation. The invention also relates to a timepiece comprising such a control device.

BACKGROUND ART

Certain timepieces are equipped with a control device that serves to actuate a mechanism of the timepiece, such as a mechanism for rewinding a barrel or a mechanism for adjusting the time. The control device comprises a crown head movable between two positions: a first position, referred to as uncoupled position, is a position in which a rotation of the crown head does not drive any particular mechanism. A second position, referred to as coupled position, is a position in which the crown head is coupled to a crown body. A rotation of the crown head drives the rotation of the crown body which itself drives said mechanism.

The known control devices have all or some of the following drawbacks:

- they can wear rapidly due to the intentional or unintentional actuation of the crown head;
- they are large and greatly restrict the esthetic aspect of the timepiece;
- the crown head is difficult to manipulate;
- the control device is ungainly when the crown head occupies one or other of the coupled or uncoupled positions.

SUMMARY OF THE INVENTION

The aim of the invention is to provide a control device and a timepiece comprising such a control device which remedy the above drawbacks and improve the control devices and timepieces known from the prior art.

More precisely, a primary subject of the invention is a control device for a timepiece, said control device being particularly compact, durable and easy to manipulate.

According to a first aspect of the invention, the control device is defined by point 1 below.

1. A control device (1) for a timepiece, comprising:
   - a body (4) intended to be mounted so as to be able to rotate about an axis of rotation (X) in a case middle (2) of a timepiece in order to drive a mechanism of the timepiece, and
   - a crown head (5) movable in translation with respect to said body, parallel to the axis of rotation, between a first position and a second position,
   - the body comprising a first coupling means (46) and the crown head comprising a second coupling means (53), said first and second coupling means being arranged such that when the crown head is in its first position, the body and the crown head are uncoupled, and such that when the crown head is in its second position, the body and the crown head are coupled,
   - the control device further comprising a locking element (6), a first formation (47A) and a second formation (47B), the locking element being able to cooperate with the first formation to stabilize the crown head in its first position, the locking element being able to cooperate with the second formation to stabilize the crown head in its second position,
   - the locking element being integral with or fixed to the crown head and the first and second formations being integral with or fixed to the body, or the locking element being integral with or fixed to the body and the first and second formations being integral with or fixed to the crown head.

According to a second aspect of the invention, the control device is defined by point 5 below.

5. A control device for a timepiece, comprising:
   - a body intended to be mounted so as to be able to rotate about an axis of rotation in a case middle of a timepiece in order to drive a mechanism of the timepiece, and
   - a crown head movable in translation with respect to said body, parallel to the axis of rotation, between a first position and a second position,
   - the body comprising a first coupling means and the crown head comprising a second coupling means, said first and second coupling means being arranged such that when the crown head is in its first position, the body and the crown head are uncoupled, and such that when the crown head is in its second position, the body and the crown head are coupled,
   - the body comprising a first indexing means and the crown head comprising a second indexing means, said first and second indexing means being arranged in such a way as to stabilize the crown head in its first position and in its second position,
   - the crown head comprising a tubular part and the body comprising an annular opening able to receive within it the tubular part, the second coupling means being arranged on a first wall of the tubular part, notably an external wall of the tubular part or respectively an internal wall of the tubular part, and the second indexing means being arranged on a second wall of the tubular part, notably an internal wall of the tubular part or respectively an external wall of the tubular part, the second wall being opposite to the first wall.

Embodiments of the control device are defined by points 2 to 4 and 6 to 9 below.

2. The control device as defined in the preceding point, wherein the locking element has a shape that exhibits symmetry of revolution centered about said axis of rotation, notably a toric shape, and wherein the first and second formations are grooves of a shape that is substantially complementary to the shape of a part of the locking element.

3. The control device as defined in either of the preceding points, wherein the crown head comprises a tubular part, and wherein the body comprises an annular opening able to receive within it the tubular part, the second coupling means being arranged on a first wall of the tubular part, and the locking element or the first and second formations being arranged on a second wall of the tubular part, the second wall being opposite to the first wall.

4. The control device as defined in the preceding point, wherein
   - the locking element is integral with or fixed to the crown head, and wherein the first and second formations are integral with or fixed to the body, and/or wherein
   - the first wall is an external wall of the tubular part, and wherein the second wall is an internal wall of the tubular part.

6. The control device as defined in one of the preceding points, wherein the first coupling means comprises a first set of splines, and wherein the second coupling means comprises a second set of splines.

7. The control device as defined in one of the preceding points, wherein it comprises a retaining means, notably a retaining screw, which is integral with the body and which passes through an opening in the crown head, the retaining means cooperating with a retaining surface of the crown head to limit the movement in translation of the crown head parallel to the axis of rotation.

8. The control device as defined in one of the preceding points, wherein the body comprises a cylindrical wall that forms a bearing able to cooperate with a circular opening in the case middle to guide the body in rotation about said axis of rotation.

9. The control device as defined in one of the preceding points, wherein the crown head further comprises a rotation prevention means, notably a toothed wheel, configured to cooperate with an element of the case middle, such as a lug, to prevent the crown head from rotating when the crown head is in its first position.

According to the invention, the timepiece is defined by point 10 below.

10. A timepiece comprising a case middle provided with an opening (21), and a control device as defined in one of the preceding points, the control device being arranged in the opening.

Embodiments of the timepiece are defined by points 11 and 12 below.

11. A timepiece comprising a case middle provided with an opening, and a control device as defined in point 9, the control device being arranged in the opening, the rotation prevention means being a toothed wheel, the case middle comprising at least one lug able to cooperate with the toothed wheel to prevent the crown head from rotating when the crown head is in its first position.

12. The timepiece as defined in either of points 10 and 11, wherein it comprises a first mechanism, notably a mechanism for rewinding a barrel, and a second mechanism, notably a mechanism for adjusting the time, the body of the control device being connected to the first mechanism and to the second mechanism such that the first mechanism is activated when the crown head is rotated in a first direction of rotation, and such that the second mechanism is activated when the crown head is rotated in a second direction of rotation, opposite to the first direction of rotation.

BRIEF DESCRIPTION OF THE DRAWINGS

These subjects, features and advantages of the present invention will be described in detail in the following non-limiting description of one particular embodiment given with reference to the appended figures, in which.

DETAILED DESCRIPTION OF PARTICULAR EMBODIMENTS

Figure 1:
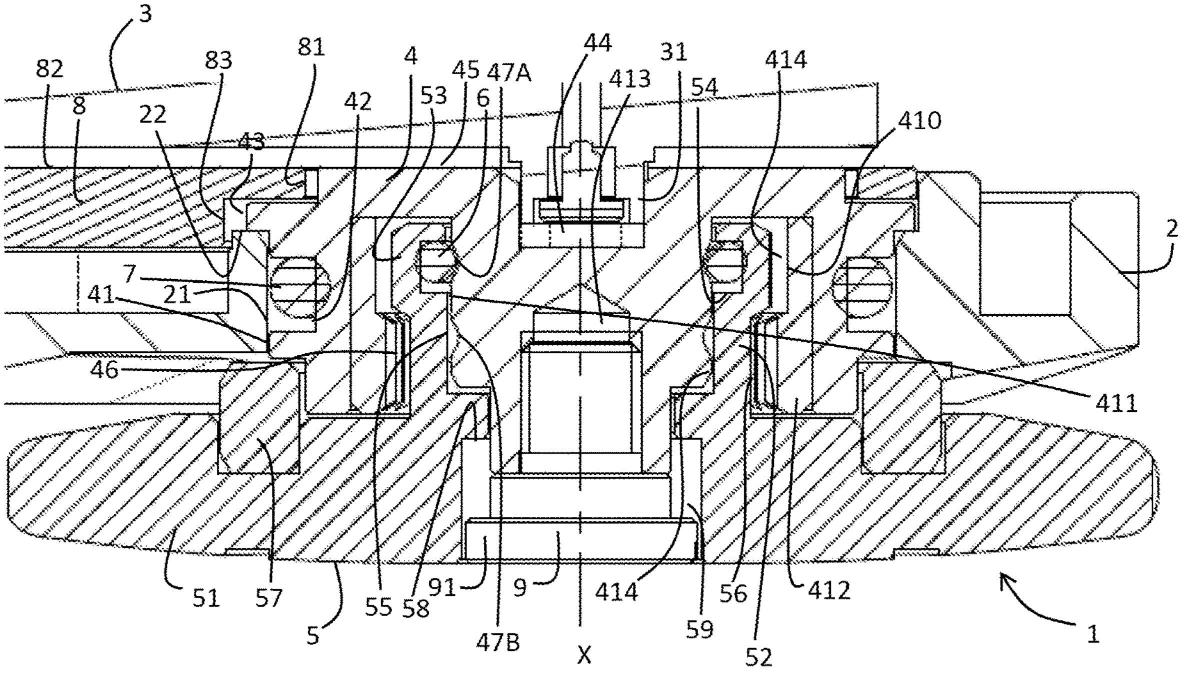
FIG. 1 is a view in section of a control device according to one embodiment of the invention, the control device being integrated into a case middle of a timepiece, a crown head of the control device being in a first position, referred to as uncoupled position.

FIGS. 1 to 5 illustrate a control device 1 according to one embodiment of the invention. The control device is integrated into a case middle 2 of a timepiece. The timepiece may notably be a wristwatch or a pocket watch. The case middle 2 is a part of a case of the timepiece. The case middle 2 comprises a lateral flank provided with an opening 21 of circular shape in which the control device 1 is arranged. The control device 1 is connected to at least one first mechanism, or movement, an element 3 of which is partially visible in FIGS. 1 and 2. The first mechanism is arranged inside the case. It may be, for example, a mechanism for rewinding a barrel of the timepiece or a mechanism for adjusting the time.

The control device notably comprises a body 4, which may also be called crown body, a crown head 5 and a locking element 6.

The body 4 is mounted so as to be able to rotate in the case middle 2 about an axis of rotation X. To this end, the body 4 comprises a cylindrical external wall 41 that forms a sliding bearing cooperating with a cylindrical wall delimiting the opening 21 of the case middle. The cooperation of the cylindrical external wall 41 with the opening 21 ensures that the body 4 is guided in rotation with respect to the case middle 2. A seal 7, for example of toric shape, is advantageously provided at the interface between the cylindrical external wall 41 and the opening 21 to prevent the intrusion of particles and/or liquid inside the timepiece. The seal 7 is arranged in a groove 42 provided in the cylindrical external wall 41. Said seal is dimensioned in such a way as to come into contact with the cylindrical wall of the case middle 2 that delimits the opening 21. In a variant of the presented embodiment, the groove could also be provided in the cylindrical wall delimiting the opening 21, the seal supported in this groove would then cooperate with a cylindrical wall of the body 4.

Furthermore, the body 4 is held axially (that is to say parallel to the axis of rotation X) on the case middle 2. In particular, the body 4 comprises a shoulder 43 held between, on the one part, a surface 22 of the case middle 2 that borders the opening 21, and, on the other part, a holding plate 8 fixed to the case middle 2. Advantageously, a clearance is provided between the shoulder 43, the surface 22 and the holding plate 8 so as to allow the body 4 to rotate without friction. Thus, the body 4 is not movable in translation with respect to the case middle 2. It has a single degree of freedom to rotate with respect to the case middle 2.

The body 4 is fixed to the element 3 so as to drive said first mechanism. To this end, the body 4 comprises an opening 44 of square cross section (readily visible in FIG. 5) centered about the axis of rotation X. The opening 44 accommodates a pin 31 which is integral with the element 3 and which has a shape complementary to the opening 44. In a variant, the connection between the element 3 and the body 4 could be obtained by any other means, notably by screw fastening. It is noted that "integral with" is understood to mean a mechanical connection without degrees of freedom. Two elements that are integral with one another are therefore two elements that are fixed to one another.

The holding plate 8 comprises an opening 81 through which the pin 31 passes. It comprises a surface 82 that is coplanar with a surface of a base 45 of the body 4. The holding plate 8 further comprises a spot face 83 in which the shoulder 43 sits. Thus, the holding plate does not increase the overall size of the control device.

Figure 2:
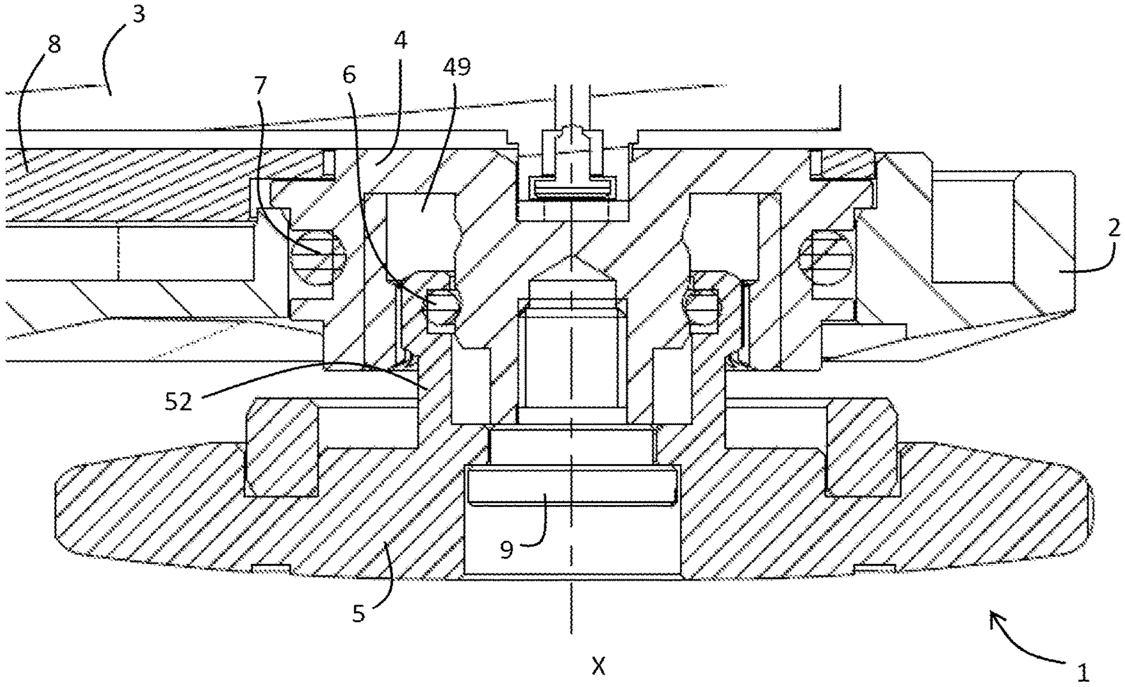
FIG. 2 is a view in section of the control device, the crown head being in a second position, referred to as coupled position.
Figure 3:
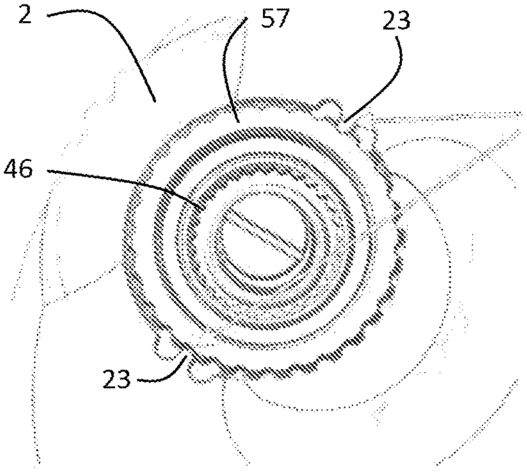
FIG. 3 is a partial top view of the control device.

The crown head 5 is movable in translation with respect to the body 4, parallel to the axis of rotation X, between a first position, referred to as uncoupled position (illustrated in FIG. 1), and a second position, referred to as coupled position (illustrated in FIG. 2).

The crown head primarily comprises a disk 51 intended to be manipulated with the fingers of a user, and a tubular part 52 able to cooperate with the body 4 when the crown head is in its second position. The crown head 5 is configured to be pulled from its first position to its second position and pushed from its second position to its first position. In other words, the first position of the crown head corresponds to a position in which it is pushed, or in other words retracted, against the case middle 2. The second position of the crown head corresponds to a position in which it is deployed, or in other words pulled. It should be observed that the passage from the first position to the second position is not obtained by screwing or unscrewing the crown head.

Figure 4:
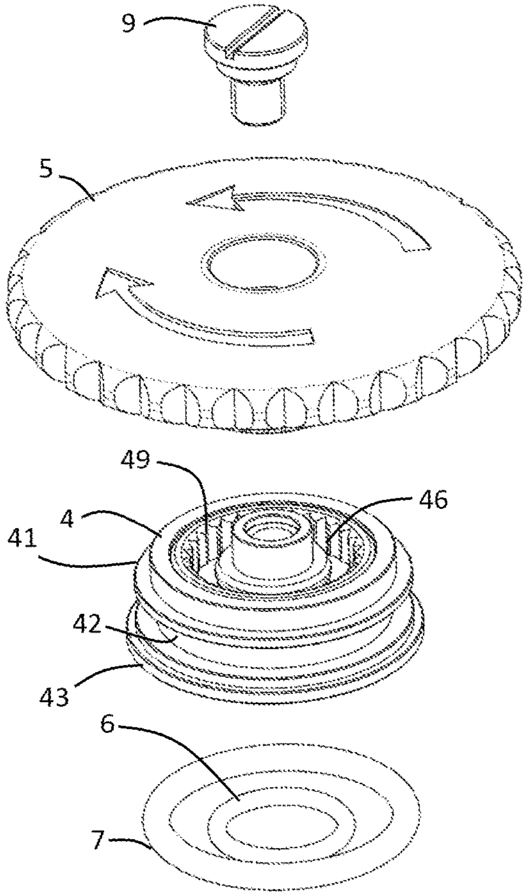
FIG. 4 is an exploded perspective top view of the control device.
Figure 5:
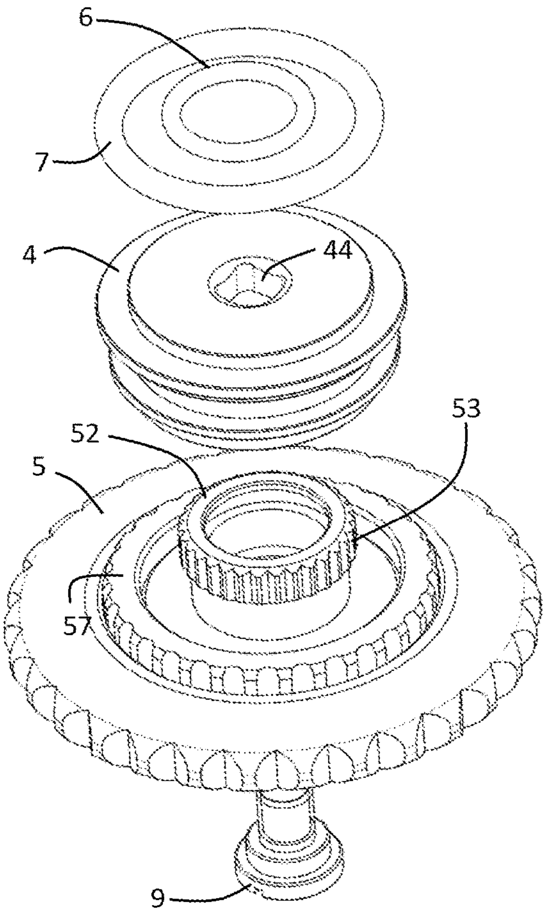
FIG. 5 is an exploded perspective bottom view of the control device.

As is readily visible in FIGS. 1, 2 and 4, the body 4 comprises an annular opening 49 able to receive within it the tubular part 52 of the crown head. In other words, the annular opening 49 can accommodate the tubular part 52. The annular opening 49 is centered about the axis of rotation X. The annular opening 49 is delimited radially by a first wall 410, of cylindrical overall shape, forming an external wall of the annular opening and by a second wall 411 forming an internal wall of the annular opening. The annular opening 49 is a blind opening, that is to say not a through-opening. The first wall is connected to the second wall at the base 45 of the body 4. The depth of the annular opening 49 along the axis of rotation X is substantially equal to the height of the tubular part along this same axis.

The body 4 comprises a first coupling means 46, and the crown head 5 comprises a second coupling means 53. In this case, the first coupling means 46 is formed by a first set of rectilinear splines. These splines, also called serrations, are arranged parallel to the axis of rotation X and distributed along the first wall 410. Even more precisely, the first set of splines extends approximately over only a part (notably only half) of the height of the first wall 410. That part of the wall 410 along which the first set of splines extends is positioned more in the direction of the disk 51. The wall 410 thus comprises a zone 414 that is free of any splines and that is positioned more in the direction of the base 45.

The second coupling means 53 is also formed by a second set of rectilinear splines which are arranged parallel to the axis of rotation X and are distributed along an external wall 56 of the tubular part. This external wall 56 also has a cylindrical shape centered about the axis of rotation X. The first set of rectilinear splines is notably readily visible in FIG. 4, and the second set of rectilinear splines is notably readily visible in FIG. 5.

As is visible in FIG. 1, when the crown head is in its first position, the first coupling means 46 occupy a position that is offset along the axis of rotation X with respect to the second coupling means 53. The first set of splines is not in contact with the second set of splines, and so the body 4 and the crown head 5 are uncoupled.

As is visible in FIG. 2, when the crown head is in its second position, the first coupling means 46 is positioned opposite the second coupling means 53. The first set of splines interlocks with the second set of spines. The body 4 and the crown head 5 are coupled, that is to say connected in rotation. When the crown head 5 is in its second position, a rotation of the crown head about the axis of rotation X therefore drives the body 4 which itself drives the element 3 of the first mechanism. The control device can thus be described as a control device with an uncouplable crown.

The first coupling means 46 may be integrated into a ring 412 that is itself fixed to the body 4. The ring 412 may notably be secured to the body 4 by press fitting. Thus, the body 4 may be formed by the assembly of two components, this facilitating its manufacturing method. In a variant, the body 4 could be a one-piece component machined from one and the same block of material.

The locking element 6 is an element for keeping the crown head in position, or in other words an indexing means. The locking element 6 is configured to selectively cooperate with a first formation 47A and with a second formation 47B. More particularly, the locking element 6 is able to cooperate with the first formation 47A to stabilize the crown head in its first position. Likewise, the locking element 6 is able to cooperate with the second formation 47B to stabilize the crown head in its second position. The set of two formations 47A, 47B therefore more generally constitutes a first indexing means, and the locking element 6 more generally constitutes a second indexing means able to cooperate with the first indexing means. The first position and the second position of the crown head are mechanically stable positions. When the crown head is moved in the vicinity of its first position or of its second position, the cooperation of the two indexing means makes it possible to position the crown head exactly in its first position or in its second position, respectively.

According to the embodiment illustrated, the locking element 6 is integral with the crown head 5, and the first and second formations 47A, 47B are integral with the body. In particular, the locking element 6 is held in a groove 54 of the tubular part 52. The groove 54 is formed in an internal wall 55, of cylindrical shape, of the tubular part 52. The dimensions of this groove 54 are such that a small clearance can exist between the edges of the groove and the locking element, notably so as to allow a deformation of the locking element 6 when the control device is being used. Thus, a "locking element integral with the crown head" is understood to mean there is a mechanical connection between these two elements that ensures a sufficient hold of the locking element on the crown head to realize an indexing function. The first and second formations are formed in the second wall 411 of the annular opening 49, facing the internal wall 55. The first and second formations are positioned next to one another along the longitudinal axis X. The distance separating the first formation from the second formation along the axis of rotation X corresponds to the amplitude of movement of the crown head between its first position and its second position.

According to the embodiment illustrated, the locking element 6 has a shape that exhibits symmetry of revolution centered about the axis of rotation X, notably a toric shape. It may be, for example, an elastomeric ring or a snap ring. The first and second formations are grooves of a shape that is substantially complementary to the shape of a part of the locking element. Notably, the grooves have a cross section in the form of a circular arc. To pass from the first position to the second position, the locking element 6 compresses in the groove 54 and relaxes when it is seated in one or other of the first or second formations. The selection of the dimensions of the groove 54, of the locking element and of the first and second formations makes it possible to adjust the retaining force produced on the crown head for holding the latter in its first position and in its second position.

According to one variant (not shown), the locking element 6 could be integral with the body 4, and the first and second formations 47A, 47B could be integral with the crown head. Notably, the locking element could be held in a groove formed in the second wall 411, and the first and second formations could be produced in the internal wall 55 of the tubular part.

According to another embodiment variant (not shown), the first and second coupling means 46, 53 could be arranged respectively on the second wall 411 of the annular opening 49 and on the internal wall 55 of the tubular part 52, whereas the locking element 6 would be arranged on the external wall 56 of the tubular part 52 and the first and second formations 47A, 47B would be arranged on the first wall 410 of the annular opening 49.

According to yet another embodiment variant (not shown), the first and second coupling means 46, 53 could be arranged respectively on the second wall 411 of the annular opening 49 and on the internal wall 55 of the tubular part 52, whereas the locking element 6 would be arranged on the first wall 410 of the annular opening 49 and the first and second formations 47A, 47B would be arranged on the external wall 56 of the tubular part 52.

Irrespective of the configuration selected from among the variants described above, a particularly compact control device is obtained. Specifically, by virtue of the annular shape of the opening 49, the body 4 comprises three concentric walls 41, 410 and 411 that each ensure a function of the control device. The first wall 410 accommodates the first coupling means and the free zone 414 that is devoid of coupling means, the second wall 411 accommodates an indexing means, and the external wall 41 forms a guide for guiding the body 4 in rotation. The size of the body 4 along the axis of rotation X is therefore dictated solely by the minimum height of each of these three walls 41, 410 and 411. Likewise, the annular opening 49 coincides with the tubular part 52 of the crown head, said tubular part comprising two concentric walls 55, 56 that each ensure a function of the control device. The internal wall 55 accommodates an indexing means, and the external wall 56 accommodates the second coupling means.

The crown head further comprises a rotation prevention means 57 configured to prevent the crown head from rotating when the crown head is in its first position. In particular, the rotation prevention means 57 is formed by a toothed wheel integral with the disk 51. The toothed wheel is fixed, for example by press fitting, to a lower face of the disk, that is to say that face of the disk 51 which is oriented toward the case middle. Thus, the toothed wheel remains invisible and protected from impacts. The toothed wheel is integrated into an annular groove provided in the disk 51. The toothed wheel comprises a plurality of teeth extending radially, that is to say perpendicularly with respect to the axis of rotation X. As is readily visible in FIG. 3 (in which the crown head has been rendered transparent), the toothed wheel cooperates with two lugs 23, formed in the case middle 2, when the crown head is in its first position in order to prevent said crown head from rotating. The lugs 23 are each positioned between two adjacent teeth of the toothed wheel. In a variant, the number of lugs could be different: for example one lug, three lugs or more, or even a number of lugs equal to the number of teeth of the toothed wheel. According to another variant, the toothed wheel and the crown head could form one and the same one-piece component. According to yet another variant, the lugs could be integral with the disk 51 and cooperate with an opening of crenelated shape formed in the case middle.

Lastly, the control device 1 also comprises a retaining means 9 that cooperates with a retaining surface 58 of the crown head to limit the movement in translation of the crown head parallel to the axis of rotation X. In this case, the retaining means 9 is formed by a retaining screw which is integral with the body 4 and which passes through an opening 59 in the crown head. The retaining screw extends parallel to the axis of rotation X and is centered on this axis of rotation. It cooperates with a tapped opening 413 provided at the center of the body 4. The retaining screw comprises a screw head 91 forming a stop that cooperates with the retaining surface 58 to prevent the crown head from decoupling from the body 4.

According to one embodiment variant, the control device 1 might not comprise such a retaining means since the cooperation of the locking element with the formation 47B already provides a first means for retaining the crown head on the body. In such a scenario, the diameter of the second wall 411 could be increased slightly, at least at a portion 414 of the second wall that is comprised between the formation 47B and the edge of this second wall. In such a scenario, the crown head could be assembled with the body 4 by forcing the retaining element 6 into an interference fit with the portion 414 and/or by heating or cooling the crown head 5 or the body 4, respectively. Advantageously, the force required to force the retaining element 6 into the portion 414 would then be far greater than that which is conventionally applied by a user to move the crown head from its first position to its second position, and this would prevent unintended decoupling of the crown head.

The timepiece may advantageously comprise a first mechanism, notably a mechanism for rewinding the barrel, and a second mechanism, notably a mechanism for adjusting the time. The body 4 may be connected directly or indirectly to the first mechanism such that the first mechanism is activated when the crown head is rotated in a first direction of rotation. The body 4 may be connected directly or indirectly to the second mechanism such that the second mechanism is activated when the crown head is rotated in a second direction of rotation, opposite to the first direction of rotation. The visible face of the disk 51 may thus comprise informative or esthetic designs such as arrows indicating that the crown head can be actuated in two opposite directions of rotation.

It should be noted that the disk 51 may also comprise an outer periphery provided with a design such as a set of slots in order to improve the grip of the fingers on the crown head. According to one embodiment variant, the rotation prevention means 57 could be formed by the set of slots that are arranged on the outer periphery of the disk 51, and not by the toothed wheel that is arranged on the lower face of the disk. Thus, the manufacturing method of the control device could be facilitated.

During use of the timepiece, when the crown head is in its first position, the latter is prevented from rotating by virtue of the cooperation of the rotation prevention means 57 with the two lugs 23 of the case middle 2. Consequently, no sliding action is produced at the interface between the locking element 6 and the body 4, and the locking element 6 is not subjected to wear. There is no risk of the crown head pivoting due to an undesired manipulation, said crown head can therefore maintain a given position, this making it possible to optimize the overall esthetic of the timepiece. Lastly, in this position, the body 4 is uncoupled from the crown head 5 and may possibly rotate freely about the axis of rotation X, without driving the crown head in rotation. The element 3 of the first mechanism may therefore also rotate about the axis of rotation X.

To pass from the first position to the second position, the user of the timepiece grasps the disk 51 and pulls it parallel to the axis of rotation X. The rotation prevention means 57 disengages from the lugs 23. This makes it possible to rotate the crown head. The first and second coupling means are positioned opposite one another. The crown head 5 then rotates conjointly with the body 4. It should be noted that in the situation in which the first set of splines has not been positioned correctly facing the second set of splines, a rotation of the crown head with respect to the body may be required. The smaller this rotation, the greater the number of splines making up the first and second sets of splines. The ends of the splines may be beveled in order to facilitate the engagement of the splines. If the body 4 remained immobile while the crown head was in its first position, the first set of splines is automatically aligned with the second set of splines.

Once the crown head is in its second position, the first and second coupling means cooperate in such a way as to secure the crown head to the body 4 for conjoint rotation. To rewind the barrel or adjust the time, the user rotates the crown head in one direction or the other about the axis of rotation X, which drives the element 3 in rotation. Owing to the coupling between the crown head and the body, no relative rotational movement between these two components is produced. Consequently, the locking element is not subjected to any load linked to sliding thereof against the body 4 and it is not subjected to wear.

Lastly, when the user has finished rotating the crown head, they can push on said crown head so as to make it resume its first position. In so doing, the first and second coupling means uncouple. A slight rotation of the crown may possibly be required so that the lugs 23 sit between two adjacent teeth of the rotation prevention means 57.

The invention makes available a control device, the crown head of which is movable between a position uncoupled from, and a position coupled to, the body. By virtue of the cooperation of the locking element with the first and second formations, the two positions of the crown head are stable positions. When the crown head is actuated in rotation, the locking element does not slide with respect to the body. Consequently, no wear of the locking element occurs as the control device is being used. The stability of the first and second positions of the crown head is thus maintained throughout the life of the timepiece. Moreover, the control device thus obtained is particularly compact. It can easily be integrated into smaller timepieces.

The invention claimed is:

1. A control device for a timepiece, comprising:

a body intended to be mounted so as to be able to rotate about an axis of rotation in a case middle of the timepiece in order to drive a mechanism of the timepiece, and a crown head movable in translation with respect to the body, parallel to the axis of rotation, between a first position and a second position, the body comprising a first coupling means and the crown head comprising a second coupling means, the first and second coupling means being arranged so that when the crown head is in the first position, the body and the crown head are uncoupled, and when the crown head is in the second position, the body and the crown head are coupled, the control device further comprising a locking element, a first formation and a second formation, the locking element being able to cooperate with the first formation to stabilize the crown head in the first position, and with the second formation to stabilize the crown head in the second position, the locking element being integral with or fixed to the crown head and the first and second formations being integral with or fixed to the body, or the locking element being integral with or fixed to the body and the first and second formations being integral with or fixed to the crown head.

2. The control device as claimed in claim 1, wherein the locking element has a shape that exhibits symmetry of revolution centered about the axis of rotation, and wherein the first and second formations re grooves of a shape that is substantially complementary to the shape of a portion of the locking element.

3. The control device as claimed in claim 1, wherein the crown head comprises a tubular part, and wherein the body comprises an annular opening able to receive within it the tubular part, the second coupling means being arranged on a first wall of the tubular part, and the locking element or the first and second formations being arranged on a second wall of the tubular part, the second wall being opposite to the first wall.

4. The control device as claimed in claim 3, wherein the locking element is integral with or fixed to the crown head, and the first and second formations are integral with or fixed to the body, and/or the first wall is an external wall of the tubular part, and the second wall is an internal wall of the tubular part.

5. A control device for a timepiece, comprising:

a body intended to be mounted so as to be able to rotate about an axis of rotation in a case middle of the timepiece in order to drive a mechanism of the timepiece, and a crown head movable in translation with respect to the body, parallel to the axis of rotation, between a first position and a second position, the body comprising a first coupling means and the crown head comprising a second coupling means, the first and second coupling means being arranged so that when the crown head is in the first position, the body and the crown head are uncoupled, and when the crown head is in the second position, the body and the crown head are coupled, the body comprising a first indexing means and the crown head comprising a second indexing means, the first and second indexing means being arranged so as to stabilize the crown head in the first position and in the second position, the crown head comprising a tubular part and the body comprising an annular opening able to receive within the tubular part, the second coupling means being arranged on a first wall of the tubular part, and the second indexing means being arranged on a second wall of the tubular part, the second wall being opposite to the first wall.

6. The control device as claimed in claim 1, wherein the first coupling means comprises a first set of splines, and wherein the second coupling means comprises a second set of splines.

7. The control device as claimed in claim 1, wherein the control device comprises a retaining means which is integral with the body and which passes through an opening in the crown head, the retaining means cooperating with a retaining surface of the crown head to limit a movement in translation of the crown head parallel to the axis of rotation.

8. The control device as claimed in claim 1, wherein the body comprises a cylindrical wall that forms a bearing able to cooperate with a circular opening in the case middle to guide the body in rotation about the axis of rotation.

9. The control device as claimed in claim 1, wherein the crown head further comprises a rotation prevention means configured to cooperate with an element of the case middle to prevent the crown head from rotating when the crown head is in the first position.

10. A timepiece comprising:

a case middle provided with an opening, and the control device as claimed in claim 1, wherein the body of the control device is mounted so as to be able to rotate about an axis of rotation in the case middle of the timepiece in order to drive a mechanism of the timepiece, the control device being arranged in the opening.

11. A timepiece comprising:

a case middle provided with an opening, and the control device as claimed in claim 9, wherein the body of the control device is mounted so as to be able to rotate about an axis of rotation in the case middle of the timepiece in order to drive a mechanism of the timepiece, the control device being arranged in the opening, the rotation prevention means being a toothed wheel, the case middle comprising at least one lug able to cooperate with the toothed wheel to prevent the crown head from rotating when the crown head is in the first position.

12. The timepiece as claimed in claim 10, wherein the timepiece comprises a first mechanism and a second mechanism, the body of the control device being connected to the first mechanism and to the second mechanism so that the first mechanism is activated when the crown head is rotated in a first direction of rotation, and the second mechanism is activated when the crown head is rotated in a second direction of rotation, opposite to the first direction of rotation.

13. The timepiece as claimed in claim 12, wherein the first mechanism is a mechanism for rewinding a barrel and the second mechanism is a mechanism for adjusting time.

14. The timepiece as claimed in claim 11, wherein the timepiece comprises a first mechanism and a second mechanism, the body of the control device being connected to the first mechanism and to the second mechanism so that the first mechanism is activated when the crown head is rotated in a first direction of rotation, and the second mechanism is activated when the crown head is rotated in a second direction of rotation, opposite to the first direction of rotation.

15. The timepiece as claimed in claim 14, wherein the first mechanism is a mechanism for rewinding a barrel and the second mechanism is a mechanism for adjusting time.

16. The control device as claimed in claim 2, wherein the locking element has a toric shape.

17. The control device as claimed in claim 5, wherein the first wall is an external wall of the tubular part and the second wall is an internal wall of the tubular part, or the first wall is an internal wall of the tubular part and the second wall is an external wall of the tubular part.

18. The control device as claimed in claim 7, wherein the retaining means is a retaining screw.

19. The control device as claimed in claim 9, wherein the rotation prevention means is a toothed wheel.

20. The control device as claimed in claim 19, wherein the element of the case middle is a lug with which the toothed wheel cooperates.

* * * * *